June 14, 1938. F. R. CURTISS Re. 20,758

FASTENING TROUSERS CUFF

Original Filed Dec. 19, 1933

INVENTOR
FRANK R. CURTISS
BY John A. Hauralian
ATTORNEY

Reissued June 14, 1938

Re. 20,758

UNITED STATES PATENT OFFICE 20,758

FASTENING TROUSERS CUFF

Frank R. Curtiss, New Haven, Conn.

Original application December 19, 1933, Serial No. 703,032, now Patent No. 2,069,601, dated February 2, 1937. Divided and application May 16, 1935, Serial No. 21,741, now Patent No. 2,056,895, dated October 6, 1936. This application for reissue March 17, 1938, Serial No. 196,575

8 Claims. (Cl. 2—232)

This invention relates to new and useful improvements in trousers cuffs and has particular relation to the securing of a trousers cuff in place at the lower end of a trousers leg.

An object of the invention is to provide a method whereby trousers cuffs may be secured in place without sewing.

Another object is to provide a method whereby a trousers cuff may be secured in place by a staple or similar fastening means and in such manner that the staple does not show at the outer side of the trousers leg and has no projections at the inner side thereof.

The invention also comprehends the trousers the cuff of which is secured in place by a staple or similar article.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:—

Figure 1:
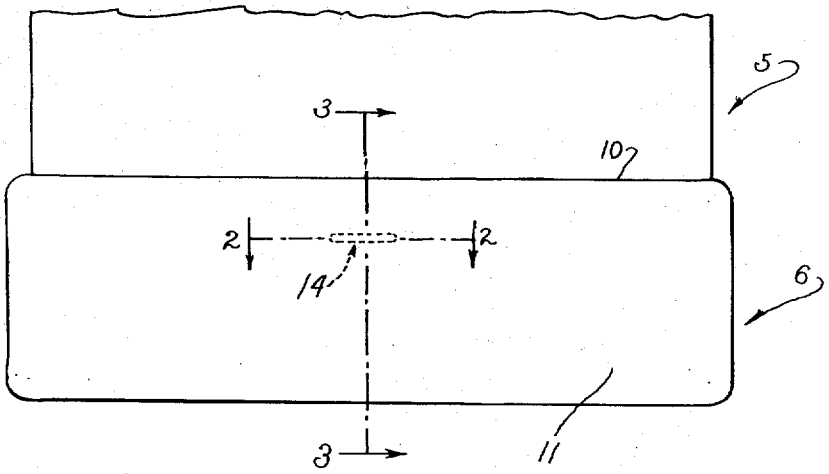
Fig. 1 is a side elevational view of the lower portion of a trousers leg with the cuff thereof secured in place in accordance with the present invention.

The present application is a division of my application Serial Number 703,032 filed December 19th, 1933, now Patent No. 2,069,601 of February 2nd, 1937 and in which is disclosed a means for satisfactorily carrying out the invention here claimed.

Referring in detail to the drawing at 5 is shown the lower portion of a trousers leg and the latter is equipped with a cuff generally designated 6. The cuff is shown as formed by folding or bending the material 7 of the trousers leg at 8 and carrying such material upwardly to provide a layer 9 at the outer side of the lower end portion of the leg 5. Depending on the depth of the cuff the material is again bent at 10 and carried downwardly providing the outer layer 11 of the cuff.

At the lower end of the trousers leg the material is again folded or bent as at 12 and carried upwardly providing a short inner layer 13 which may be sewed in place in the usual manner. Heretofore, it has been the practice to sew the cuff 6 into the position in which it is shown and this is usually done by passing a few stitches through the cuff adjacent the upper edge thereof at each side of the trousers leg. When the trousers are sent to a cleaning establishment it is necessary to open the cuff or fold it down and accordingly the above mentioned stitches are cut. After the cleaning operation the cuff must be again secured in its proper place and this is accomplished, in the prior practice, by again sewing it as above described.

Figure 2:
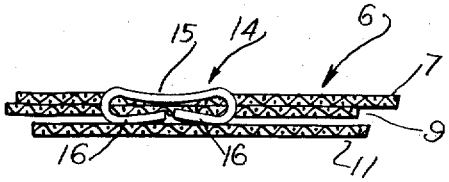
Fig. 2 is an enlarged sectional view taken substantially along the line 2—2 of Fig. 1.

According to the present invention the trousers cuff is secured in place quickly without sewing with a thread and needle and the invention provides for the securing of the cuff by unskilled persons. As here disclosed the cuff 6 is secured in place by means of a staple 14. The staple is preferably inserted from the inner side of the trousers leg so that the staple crown 15 is at the inner side of the trousers leg while the staple prongs 16 are caused to penetrate the fabric or layer 7 of the trousers leg 5 and the inner layer of fabric 9 of the cuff. However, the staple prongs 16 are prevented from passing through the outer layer 11 of the cuff and as clearly shown in Fig. 2 are clinched against the outer surface of the inner layer 9 of the cuff.

Figure 3:
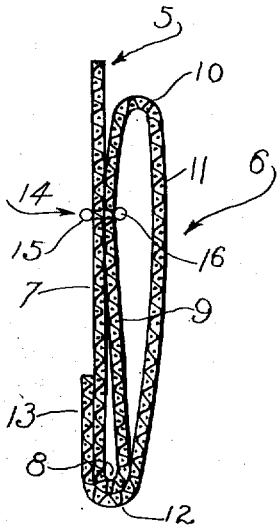
Fig. 3 is an enlarged sectional view taken substantially along the line 3—3 of Fig. 1.
Figure 4:
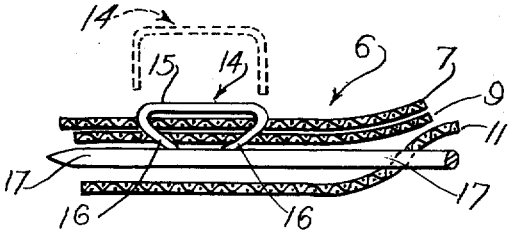
Fig. 4 is a view similar to Fig. 2 but showing the manner of applying a staple.

It is preferred that the staples be applied with the aid of some means such as that disclosed in my patent above identified. When a cuff is to be secured in place an anvil means in the form of a needle-like part 17 (see Fig. 4) is passed through the outer layer 11 of the cuff and the staple 14 is then driven against such means from the inner side of the trousers leg. Normally the staple is substantially in the form of an inverted U as shown by the dotted lines in Fig. 4 and as the staple prongs engage the anvil 17 they are deflected as shown by the full lines in said figure. When the staple is fully driven it occupies the position of Fig. 3. By means of the anvil 17 the staple prongs are prevented from passing through the outer layer 11 of the cuff and as they are driven they are clinched against the outer surface of the layer 9 of the cuff.

Thus it will be seen that the layers of fabric 7 and 9 are secured together by the staple 14 and are clamped against one another since a portion of each layer is gripped between the clinched staple prongs 16 and the staple crown 15. Obviously, one or more staples may be applied to each side of the trousers leg so as to secure the cuff in place. It is particularly noted that the staple is inserted, by preference, from the inner side of the trousers leg and is prevented fom passing though the outer layer 11 of the cuff. Therefore, where the staple is in place it is not exposed at the outer side of the trousers leg and in addition only its crown is at the inner side of the leg whereby the staple is not visible and the points or ends of its prongs are embedded in the laminated construction forming the cuff and are thus not in position to catch on the hose of a wearer or to scratch a wearer.

In the drawing the staple prongs are bent toward one another to clinch them but when the cuff is to be opened or folded down this may be easily accomplished by catching the upper edge of the cuff and the trousers leg and pulling the cuff open. This causes the prongs of the staple to open without tearing the fabric and the cuff may be easily cleaned and again secured in place by new staples. The prongs may be clinched by bending them in any desired direction relative to the staple crown, it being only necessary that they be deflected out of their normal relation to the crown.

Having thus set forth the nature of my invention, what I claim is:—

1. A trousers leg comprising at its lower end a cuff including inner and outer layers of fabric connected at their upper edges, a staple having its crown at the inner side of the trousers leg and having its prongs passing through the fabric of the trousers legs and all but the outer of said layers and clinched whereby the staple secures the cuff in place and is concealed by the outer layer of the cuff.

2. The method of securing in place at the lower edge portion of a trousers leg a cuff including inner and outer layers of fabric connected at their upper edges, comprising locating an anvil member between the outer and inner layers of the fabric of said cuff, passing the prongs of a staple through the lower portion of the trousers leg and the inner layer of the fabric of the cuff while the cuff is in place at the side of the trousers leg, and forcing the prongs of the staple against said anvil to prevent the prongs passing through the outer layer of the fabric of the trousers cuff and to clinch such prongs against the outer surface of the inner layer of fabric of the trousers cuff.

3. The method of securing in place at the lower edge portion of a trousers leg a cuff including inner and outer layers of fabric connected at their upper edges, comprising locating an anvil member between the outer and inner layers of the fabric of said cuff, passing a prong of a pronged fastener through the lower portion of the trousers leg and the inner layer of the fabric of the cuff while the cuff is in place at the side of the trousers leg, and forcing the prong of the fastener against said anvil to prevent the prong passing through the outer layer of the fabric of the cuff and to clinch such prong against the outer surface of the inner layer of fabric of the cuff.

4. A trousers leg comprising at its lower end, a cuff including inner and outer layers of fabric connected at their upper edges, a staple passing through all of the layers of fabric of the trousers leg except the outer of said layers and fastened, whereby the staple secures the cuff in place and is concealed by the outer layer of the cuff.

5. The method of securing in place at the lower edge portion of a trousers leg a cuff including inner and outer layers of fabric connected at their upper edges, consisting in passing the prongs of a staple through the lower portion of the trousers leg and the inner layer of the fabric of the cuff while the cuff is in place at the side of the trousers leg, and clinching the ends of the prongs of the staple between the layers of the fabric of the cuff, whereby the anchoring of the staple is inwardly of the outer layer of fabric of the cuff.

6. In combination with a trousers leg and a cuff at one end thereof including inner and outer layers of fabric connected at their upper edges, a staple fastening the cuff to the leg comprising prongs including free end portions passing through the leg and penetrating an inner layer of the cuff, and said free ends deflected to secure the cuff in place and prevent casual withdrawal of the prongs from the trousers.

7. A trousers leg comprising at its lower end, a cuff including inner and outer layers of fabric connected at their upper edges, a staple passing through the fabric of the trousers leg and engaging with an inner layer of the cuff but not penetrating through the outermost layer of the cuff whereby the staple is concealed from the outer side of the cuff, and said staple deflected whereby it secures the cuff in place.

8. In combination with a trousers leg and a cuff at one end thereof including inner and outer layers of fabric connected at their upper edges, a staple fastening the cuff to the leg comprising prongs including free ends passing through the leg and penetrating an inner layer of the cuff and deflected to secure the cuff in place and prevent casual withdrawal of the staple, and said free ends of the prongs embedded in the laminated construction represented by the trousers leg and cuff.

FRANK R. CURTISS.